(12) United States Patent
Alexander et al.

(10) Patent No.: US 8,769,946 B2
(45) Date of Patent: *Jul. 8, 2014

(54) COOLING SYSTEM

(75) Inventors: Paul W. Alexander, Ypsilanti, MI (US);
Alan L. Browne, Grosse Pointe, MI (US); Nancy L. Johnson, Northville, MI (US); Patrick B. Usoro, Troy, MI (US); Nilesh D. Mankame, Ann Arbor, MI (US); Xiujie Gao, Troy, MI (US); Geoffrey P. McKnight, Los Angeles, CA (US); John A. Cafeo, Farmington, MI (US); Christopher P. Henry, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 697 days.

This patent is subject to a terminal disclaimer.

(21) Appl. No.: 12/947,857

(22) Filed: Nov. 17, 2010

(65) Prior Publication Data
US 2011/0121582 A1    May 26, 2011

Related U.S. Application Data

(60) Provisional application No. 61/263,308, filed on Nov. 20, 2009.

(51) Int. Cl.
*F01B 29/10* (2006.01)
*F02G 1/04* (2006.01)

(52) U.S. Cl.
USPC ............ 60/527; 60/528; 60/529; 60/616; 60/618; 60/620

(58) Field of Classification Search
USPC ............ 60/527–529, 616, 618, 620
See application file for complete search history.

(56) References Cited

U.S. PATENT DOCUMENTS

| | | | |
|---|---|---|---|
| 4,041,706 A * | 8/1977 | White | 60/527 |
| 4,055,955 A | 11/1977 | Johnson | |
| 4,087,971 A * | 5/1978 | Hart | 60/527 |
| 4,150,544 A | 4/1979 | Pachter | |
| 4,275,561 A * | 6/1981 | Wang | 60/527 |
| 5,279,123 A * | 1/1994 | Wechsler et al. | 60/527 |
| 5,327,987 A | 7/1994 | Abdelmalek | |

(Continued)

FOREIGN PATENT DOCUMENTS

| | | |
|---|---|---|
| CN | 1421302 A | 6/2003 |
| DE | 102007006146 A1 | 8/2008 |
| JP | 5215063 A | 8/1893 |

*Primary Examiner* — Kenneth Bomberg
*Assistant Examiner* — Daniel Wagnitz
(74) *Attorney, Agent, or Firm* — Quinn Law Group, PLLC

(57) ABSTRACT

A cooling system configured for converting thermal energy to mechanical energy includes a source of thermal energy provided by a temperature difference between a heat source having a first temperature and a coolant having a second temperature that is lower than the first temperature. The cooling system includes a cooling circuit configured for conveying the coolant to and from the heat source. The cooling circuit includes a conduit and a pump in fluid communication with the conduit and configured for delivering the coolant to the heat source. The cooling system also includes a heat engine disposed in thermal relationship with the conduit and configured for converting thermal to mechanical energy. The heat engine includes a first element formed from a first shape memory alloy having a crystallographic phase changeable between austenite and martensite at a first transformation temperature in response to the temperature difference between the heat source and coolant.

16 Claims, 3 Drawing Sheets

(56) References Cited

U.S. PATENT DOCUMENTS 5,442,914 A * 8/1995 Otsuka ............................ 60/527
5,899,071 A * 5/1999 Stone et al. .................. 60/641.8
7,370,612 B2 * 5/2008 Hanai ........................ 123/41.14
7,444,812 B2 * 11/2008 Kirkpatirck et al. ............ 60/528

* cited by examiner

COOLING SYSTEM

CROSS-REFERENCE TO RELATED APPLICATIONS

This application claims the benefit of U.S. Provisional Patent Application No. 61/263,308, filed Nov. 20, 2009, which is hereby incorporated by reference in its entirety.

TECHNICAL FIELD

The present disclosure generally relates to a cooling system, and more specifically, to a cooling system configured for converting thermal energy to mechanical energy.

BACKGROUND

Vehicles may be powered by an engine and/or one or more batteries. For example, the engine may provide motive power for the vehicle and/or charge the batteries. The batteries, in turn, may provide power for starting the engine and vehicle accessories, and/or may provide motive power for the vehicle.

Both engines and batteries may produce a large quantity of waste heat, i.e., excess thermal energy, during operation. Therefore, engines and batteries are often cooled with a coolant to remove excess thermal energy through heat exchange and dissipation to the atmosphere. Despite improvements in engine and combustion technology, nearly one-quarter of fuel energy may be expelled as waste heat during operation of the engine and/or batteries. Therefore, significant gains in vehicle fuel economy may be realized if waste heat is converted into usable mechanical and/or electrical energy.

SUMMARY

A cooling system configured for converting thermal energy to mechanical energy includes a source of thermal energy provided by a temperature difference between a heat source having a first temperature and a coolant having a second temperature that is lower than the first temperature. The cooling system also includes a cooling circuit configured for conveying the coolant to and from the heat source. The cooling circuit includes a conduit, and a pump in fluid communication with the conduit and configured for delivering the coolant to the heat source. Further, the cooling system includes a heat engine disposed in thermal relationship with the conduit and configured for converting thermal energy to mechanical energy. The heat engine includes a first element formed from a first shape memory alloy having a crystallographic phase changeable between austenite and martensite at a first transformation temperature in response to the temperature difference between the heat source and the coolant.

In one variation, the conduit is configured for recirculating the coolant in a closed loop within the cooling circuit. Further, the cooling system includes a member disposed in contact with the conduit and configured for conducting thermal energy from the conduit to the heat engine. The member includes a plurality of contacting objects configured for contacting the first element to thereby change the crystallographic phase between austenite and martensite. In addition, the cooling system includes an insulator disposed in contact with the conduit and the member and configured for thermally insulating the conduit and the member. The cooling system also includes a generator configured for converting mechanical energy to electricity, wherein the first shape memory alloy alternately dimensionally expands at a localized region in response to the second temperature and dimensionally contracts at another localized region in response to the first temperature to thereby convert thermal energy to mechanical energy and drive the generator.

In another variation, the cooling system includes a radiator in fluid communication with the heat source and the heat engine. The radiator is configured for dissipating thermal energy from the coolant.

The cooling system provides excellent conversion of thermal energy to mechanical energy. That is, the cooling system harvests thermal energy in the form of waste heat and produces mechanical output. Further, the heat engine is efficiently integratable into the cooling system to maximize mechanical energy output.

The above features and advantages and other features and advantages of the present disclosure are readily apparent from the following detailed description of the best modes for carrying out the disclosure when taken in connection with the accompanying drawings.

DETAILED DESCRIPTION

Figure 1:
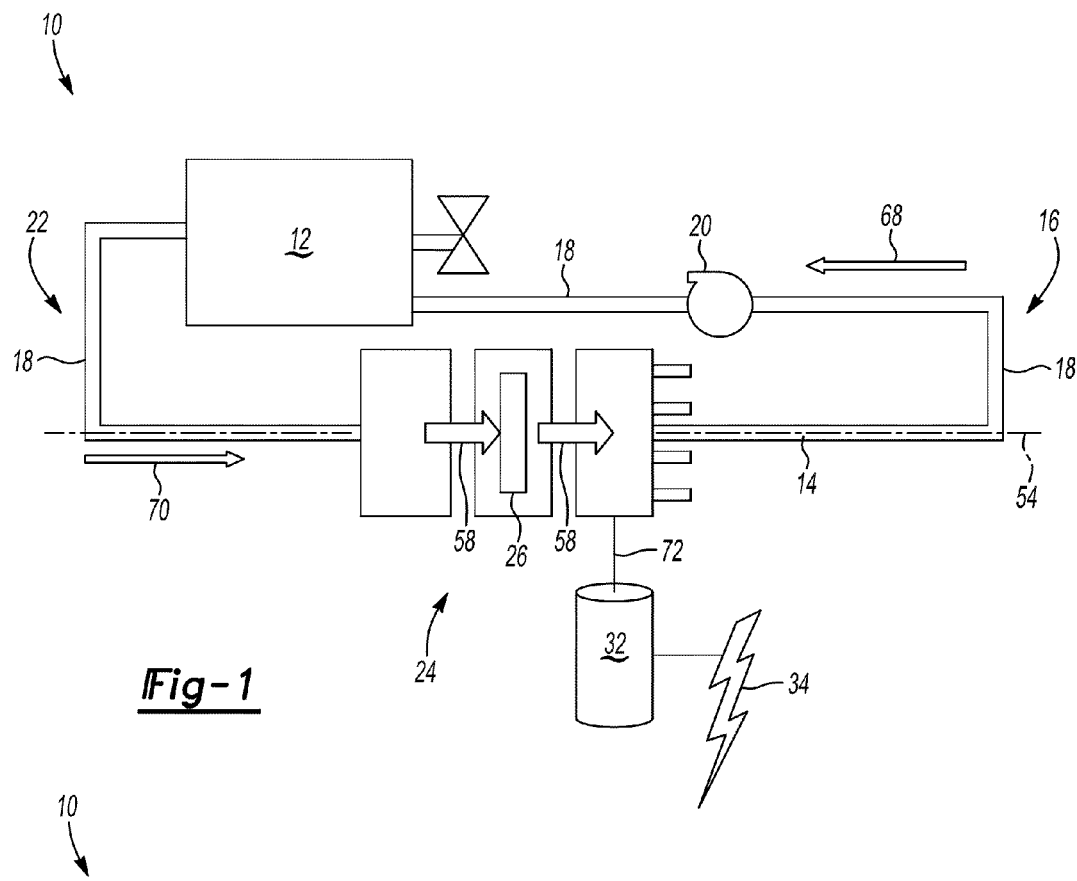
FIG. 1 is a schematic diagram of a cooling system including a heat engine.

Referring to the Figures, wherein like reference numerals refer to like elements, a cooling system is shown generally at 10 in FIG. 1. The cooling system 10 is configured for converting thermal energy to mechanical energy. Therefore, the cooling system 10 may be useful for automotive applications including, but not limited to, vehicle cooling systems, powertrain systems, and electrical systems. However, the cooling system 10 may also be useful for non-automotive applications, such as, but not limited to, household heating, ventilating, and air conditioning systems. Based on the excellent conversion of thermal energy to mechanical energy, the cooling system 10 may have other non-automotive applications, such as, but not limited to, applications utilizing battery coolant and household and geothermal waste heat. The cooling system 10 may also directly drive mechanical devices including pumps and fans to bypass a mechanical-to-electrical energy conversion step and thereby minimize energy loss in a system.

Referring now to FIG. 1, the cooling system 10 includes a source of thermal energy. The source of thermal energy is provided by a temperature difference, $\Delta T$, between a heat source 12 having a first temperature, $T_1$, and a coolant 14 having a second temperature, $T_2$, that is lower than the first temperature, $T_1$. That is, the first temperature, $T_1$, is higher and different than the second temperature, $T_2$. For example, the temperature difference, $\Delta T$, between the first temperature, $T_1$, and the second temperature, $T_2$, may be as little as about 5° C. and no more than about 100° C. Stated differently, the temperature difference, $\Delta T$, may be greater than or equal to about 5° C. and less than or equal to about 30° C., e.g., less than or equal to about 10° C. As non-limiting examples, although not shown, the temperature difference, $\Delta T$, may exist between or within catalytic converters, battery compartments, transmissions, wheels, brakes, shock absorbers, radiators, heat exchangers, mufflers, turbo/super chargers, plug-in units, and vehicle exteriors. For example, the heat source 12 may exist between or within engine lubrication systems, engine coolant systems, battery cooling systems, and the like.

Figure 3:
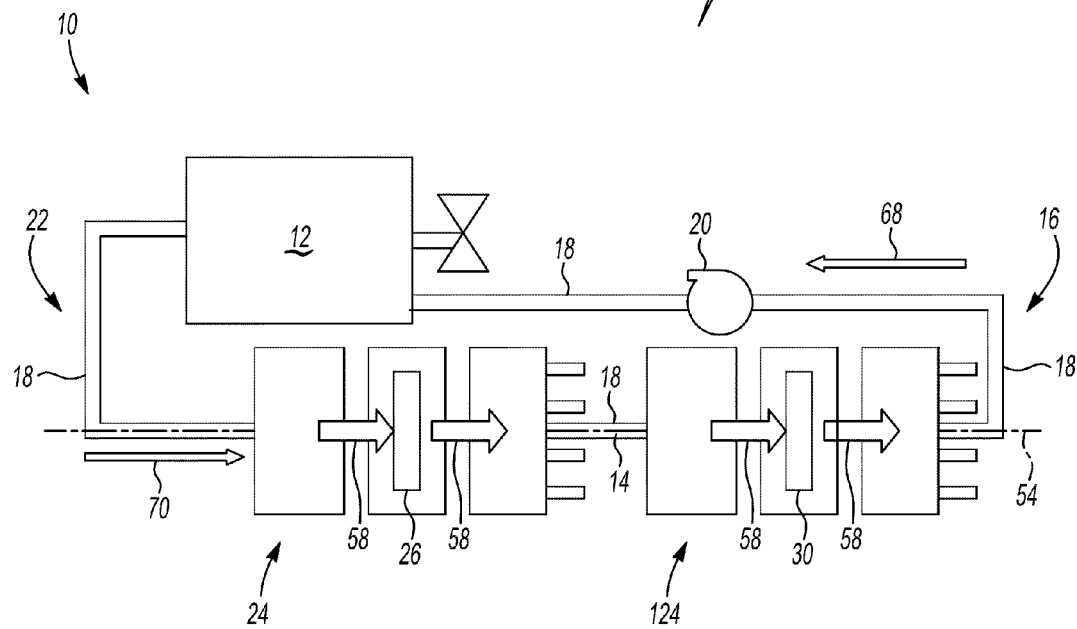
FIG. 3 is a schematic diagram of a variation of the cooling system of FIG. 1 including a plurality of heat engines.
Figure 4:
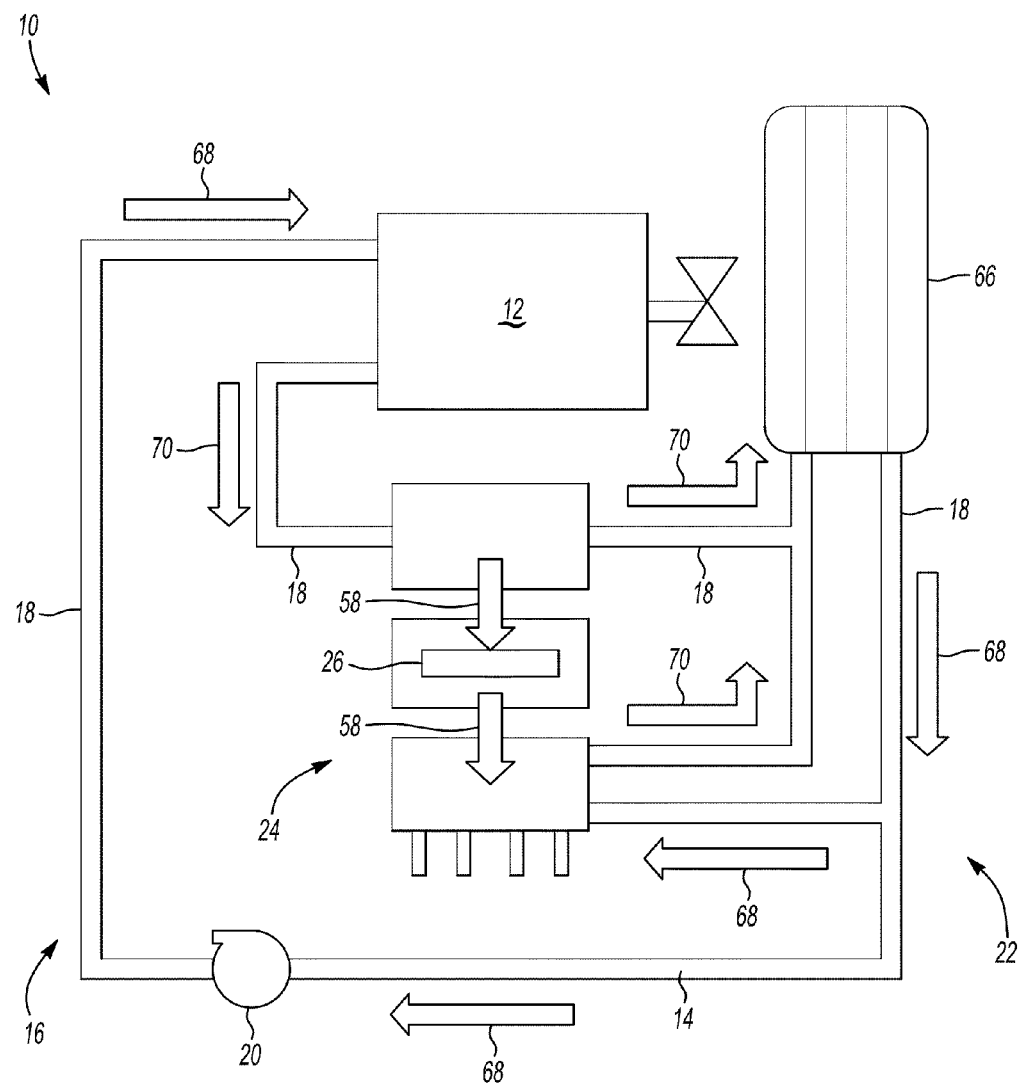
FIG. 4 is a schematic diagram of another variation of the cooling system of FIG. 1 including a radiator in fluid communication with the heat engine.

Although represented schematically in FIGS. 1, 3, and 4, non-limiting examples of the heat source 12 may include an engine of a vehicle (not shown), a comparatively warmer portion of the coolant 14, exhaust emissions of the vehicle, and/or ambient air in an environment external to the vehicle. Alternatively, the heat source 12 may be a thermal output of a battery (not shown), vehicle accessory (not shown), and/or vehicle component (not shown), such as an exhaust stream of a catalytic converter.

The coolant 14 may be selected from the group of gases, liquids, and combinations thereof. For example, the coolant 14 may be a liquid such as, but not limited to, water or oil. The coolant 14 may have the same composition as the heat source 12 or may have a different composition than the heat source 12. In one variation, the heat source 12 and the coolant 14 may each be a cooling fluid in the form of a liquid, such as engine oil or transmission oil, but the heat source 12 may be a comparatively warmer portion of the cooling fluid that is upstream of a comparatively cooler portion of the cooling fluid. Alternatively, the coolant 14 may be an ambient environment external to the vehicle (not shown), such as relatively cool air flow over the vehicle during vehicle travel. Therefore, the coolant 14 may have a different form or phase than the heat source 12. For example, the heat source 12 may be the engine, and the coolant 14 may circulate around and/or through the engine to cool the heat source 12.

Referring again to FIG. 1, the cooling system 10 also includes a cooling circuit 16 configured for conveying the coolant 14 to and from the heat source 12. The cooling circuit 16 includes a conduit 18 and a pump 20. The conduit 18 may be a pipe or flexible tube that is configured for conveying the coolant 14 through the cooling circuit 16. That is, in one variation, the conduit 18 is configured for recirculating the coolant 14 in a closed loop (shown generally at 22 in FIGS. 1, 3, and 4) within the cooling circuit 16. Although the conduit 18 may have any shape or configuration, the conduit 18 may be a hollow cylindrical pipe configured for transferring the coolant 14 from one vehicle component to another. For example, the cooling circuit 16 including the conduit 18 may be a condenser, radiator, and fan module (CRFM), and may channel the coolant 14, and accompanying waste heat, away from the heat source 12 for dissipation to the atmosphere external to the vehicle.

With continued reference to FIG. 1, the pump 20 is in fluid communication with the conduit 18 and is configured for delivering the coolant 14 to the heat source 12. The pump 20 may be any device suitable for delivering the coolant 14 to the heat source 12. For example, the pump 20 may be a water pump. The pump 20 is in fluid communication with the conduit 18 to move the coolant 14 through the conduit 18 to and from the heat source 12. Although not shown, the cooling circuit 16 may include a plurality of pumps 20 disposed in series or parallel along the conduit 18 of the cooling circuit 16.

With continued reference to FIG. 1, the cooling system 10 also includes a heat engine 24. The heat engine 24 is configured for converting thermal energy, e.g., heat, to mechanical energy, as set forth in more detail below. More specifically, the heat engine 24 includes a first element 26 formed from a first shape memory alloy having a crystallographic phase changeable between austenite and martensite at a first transformation temperature, $T_{trans1}$, in response to the temperature difference, $\Delta T$, between the heat source 12 and the coolant 14. That is, the first shape memory alloy may have a specific transformation temperature, $T_{trans1}$, at which the first shape memory alloy transitions between crystallographic phases.

As used herein, the terminology "shape memory alloy" refers to alloys which exhibit a shape memory effect and have the capability to quickly change properties in terms of stiffness, spring rate, and/or form stability. That is, the first shape memory alloy may undergo a solid state crystallographic phase change via molecular or crystalline rearrangement to shift between a martensite phase, i.e., "martensite", and an austenite phase, i.e., "austenite". Stated differently, the first shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the first shape memory alloy begins to change from the austenite phase to the martensite phase is known as the martensite start temperature, $M_s$. The temperature at which the first shape memory alloy completes the change from the austenite phase to the martensite phase is known as the martensite finish temperature, $M_f$, or first transformation temperature, $T_{trans1}$. Similarly, as the first shape memory alloy is heated, the temperature at which the first shape memory alloy begins to change from the martensite phase to the austenite phase is known as the austenite start temperature, $A_s$. In addition, the temperature at which the first shape memory alloy completes the change from the martensite phase to the austenite phase is known as the austenite finish temperature, $A_f$, or first transformation temperature, $T_{trans1}$.

Therefore, the first element 26 formed from the first shape memory alloy may be characterized by a cold state, i.e., when a temperature of the first shape memory alloy is below the martensite finish temperature, $M_f$, or first transformation temperature, $T_{trans1}$, of the first shape memory alloy. Likewise, the first element 26 may also be characterized by a hot state, i.e., when the temperature of the first shape memory alloy is above the austenite finish temperature, $A_f$, or first transformation temperature, $T_{trans1}$, of the first shape memory alloy.

In operation, the first shape memory alloy that is pre-strained or subjected to tensile stress can change dimension upon changing crystallographic phase to thereby convert thermal energy to mechanical energy. That is, when exposed to the source of thermal energy, the first shape memory alloy can change dimension upon changing crystallographic phase to thereby convert thermal energy to mechanical energy. In particular, the first shape memory alloy may change crystallographic phase from martensite to austenite and thereby dimensionally contract at a localized region (represented generally at 28 in FIG. 2) in response to the heat source 12 to convert thermal energy to mechanical energy. More specifically, the first shape memory alloy may dimensionally contract if the first shape memory alloy has been previously pre-strained pseudoplastically. The terminology "pre-strained pseudoplastically" refers to stretching, e.g., straining, the first element 26 under load while the first shape memory alloy is in the martensite phase. The shape of the first shape memory alloy under loading does not fully recover when the first element 26 is unloaded. In contrast, a shape of the first element 26 when strained under purely elastic strain may fully recover. Therefore, upon unloading, the first element 26 formed from the first shape memory alloy appears to have plastically deformed, but when the first element 26 is heated to the austenite start temperature, $A_s$, the strained shape can be recovered so that the first element 26 returns to an original length. That is, it is possible to load the first shape memory alloy such that an elastic strain limit of the first shape memory alloy is surpassed and deformation takes place in the martensitic crystal structure of the first shape memory alloy prior to exceeding a true plastic strain limit of the first shape memory alloy. Strain of this type, between the elastic strain limit and the true plastic strain limit, is pseudoplastic strain.

Therefore, the first element 26 formed from the first shape memory alloy may be stretched before installation in the heat engine 24 such that the nominal length of the first shape memory alloy includes the recoverable pseudoplastic strain. Such recoverable pseudoplastic strain may provide motion for actuating and/or driving the heat engine 24. Therefore, without pre-stretching the first shape memory alloy, little deformation may occur during crystallographic phase change. Further, the first element 26 may be subjected to a tensile force provided by a biasing mechanism, e.g., a spring or a tensioned austenitic section of the first shape memory alloy, to effect crystallographic phase change.

Figure 2:
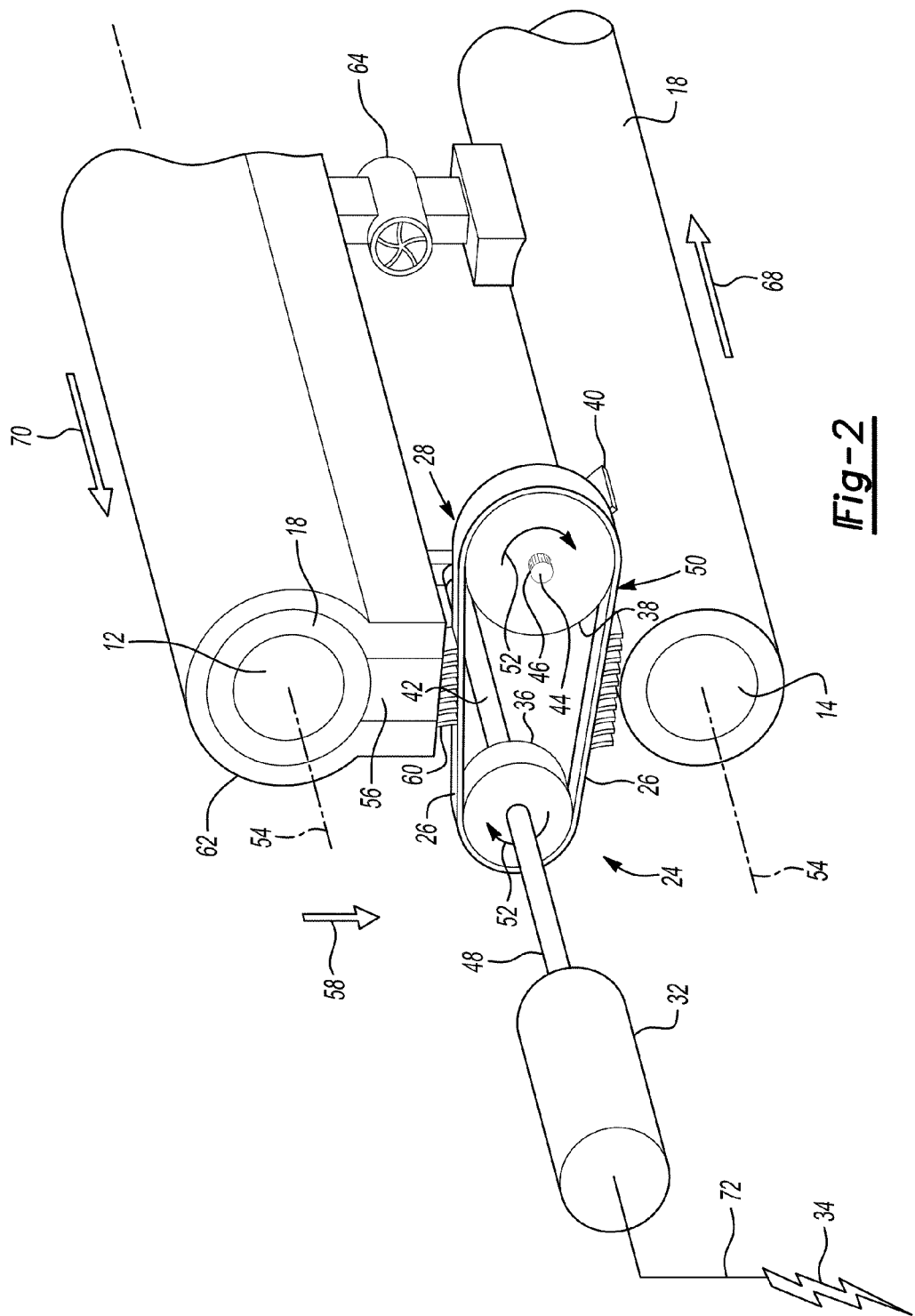
FIG. 2 is a schematic perspective view of an exemplary heat engine of FIG. 1.

Conversely, with continued reference to FIG. 2, the first shape memory alloy may change crystallographic phase from austenite to martensite to thereby dimensionally expand at the localized region 28 in response the coolant 14. For example, when the first shape memory alloy is subjected to a tensile stress and the second temperature, $T_2$, the first shape memory alloy may dimensionally expand. The first shape memory alloy may thereby convert thermal energy to mechanical energy by alternately expanding and contracting. That is, the first shape memory alloy may alternately dimensionally expand at the localized region 28 in response to the second temperature, $T_2$, and dimensionally contract at the localized region 28 in response to the first temperature, $T_1$, to thereby convert thermal energy to mechanical energy, as set forth in more detail below.

The first shape memory alloy may have any suitable composition. In particular, the first shape memory alloy may include in combination an element selected from the group of cobalt, nickel, titanium, indium, manganese, iron, palladium, zinc, copper, silver, gold, cadmium, tin, silicon, platinum, and gallium. For example, suitable first shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The first shape memory alloy can be binary, ternary, or any higher order so long as the first shape memory alloy exhibits a shape memory effect, e.g., a change in shape orientation, damping capacity, and the like. The first shape memory alloy may be selected according to desired operating temperatures of the cooling system 10, as set forth in more detail below. In one specific example, the first shape memory alloy may include nickel and titanium.

Further, the first element 26 formed from the first shape memory alloy may have any suitable form, i.e., shape. For example, the first element 26 may have a form of a shape-changing element. That is, the first element 26 may have a form selected from the group of springs, tapes, wires, bands, continuous loops, and combinations thereof. Referring to FIG. 2, in one variation, the first element 26 may be configured as a continuous loop.

Referring now to FIG. 3, in another variation, the cooling system 10 may include at least a second element 30 formed from a second shape memory alloy having a crystallographic phase changeable between austenite and martensite at a second transformation temperature, $T_{trans2}$, in response to the temperature difference, $\Delta T$, between the heat source 12 and the coolant 14. That is, the cooling system 10 may include a plurality of elements 26, 30, and the elements 26, 30 may be formed from the same or different shape memory alloys. The second element 30 may be selected so that the second transformation temperature, $T_{trans2}$, is lower than the first transformation temperature, $T_{trans1}$, of the first element 26. Therefore, the second shape memory alloy may change between austenite and martensite at a lower temperature, as set forth in more detail below.

For the variation including a plurality of elements 26, 30, each of the elements 26, 30 may have a different transformation temperature, $T_{trans}$, at which the crystallographic phase changes between austenite and martensite. That is, each element 26, 30 may change crystallographic phase at a different transformation temperature, $T_{trans}$, but may cooperate with other elements 26, 30, e.g., combine mechanical energy output, to produce a maximum amount of mechanical energy.

In an alternative arrangement, the first element 26 may further have at least the second transformation temperature, $T_{trans2}$, along a thickness of the first element 26 at which the crystallographic phase changes between austenite and martensite. That is, the first element 26 may have a plurality of transformation temperatures, $T_{trans}$, along the thickness of the first element 26 at which the crystallographic phase changes between austenite and martensite. Therefore, one or more portions of the first element 26 may change crystallographic phase before another portion of the first element 26. In yet another variation, the first element 26 may include multiple, simultaneous crystallographic phase changes along the thickness of the first element 26.

In operation, as described with reference to FIGS. 1 and 2 and set forth in more detail below, the first shape memory alloy may change crystallographic phase between austenite and martensite when in thermal relationship with one of the heat source 12 and the coolant 14. For example, when in thermal relationship with the heat source 12, the first shape memory alloy may change from martensite to austenite. Likewise, when in thermal relationship with the coolant 14, the first shape memory alloy may change from austenite to martensite.

The first shape memory alloy may convert thermal energy to mechanical energy via any suitable manner. For example, the first element 26 formed from the first shape memory alloy may activate a pulley system (shown generally in FIG. 2 and set forth in more detail below), engage a lever (not shown), rotate a flywheel (not shown), engage a screw (not shown), and the like.

Referring again to the heat engine 24 of FIG. 1, the heat engine 24 is disposed in thermal relationship, e.g., in heat exchange relationship, with the conduit 18. For example, as shown in FIG. 2, the heat engine 24 may be disposed adjacent the conduit 18 so that thermal energy may transfer from the conduit 18 to the heat engine 24.

Referring to FIGS. 1 and 2, the cooling system 10 may also include a generator 32. The generator 32 may be configured for converting mechanical energy to electricity (represented generally by symbol 34 in FIGS. 1 and 2). The generator 32 may be any suitable device for converting mechanical energy to electricity 34. For example, the generator 32 may be an electrical generator that converts mechanical energy to electricity 34 using electromagnetic induction, and may include a rotor (not shown) that rotates with respect to a stator (not shown). Therefore, thermal energy may be harvested and converted to mechanical energy and/or electricity 34 for reuse by the engine (not shown) and/or storage in a battery (not shown) of the vehicle.

Referring again to FIG. 2, the generator 32 may be driven by the heat engine 24. That is, mechanical energy resulting from the conversion of thermal energy by the first element 26 may drive the generator 32. In particular, the aforementioned dimensional contraction and dimensional expansion of the first element 26 formed from the first shape memory alloy may drive the generator 32, as set forth in more detail below.

In one non-limiting example shown in FIG. 2, the first element 26 may be configured in a continuous loop. In this example, the heat engine 24 may include a plurality of pulleys 36, 38 or wheels configured for supporting the first element 26. The heat engine 24 may also include a frame 40 configured for supporting the plurality of pulleys 36, 38 or wheels. For example, the plurality of pulleys 36, 38 or wheels may be disposed on a plurality of axles 42, 44, and may rotate with respect to the frame 40. The first element 26 formed from the first shape memory alloy may be supported by and travel along the wheels or pulleys 36, 38. That is, in this variation, the continuous loop may translate along the plurality of pulleys 36, 38.

With continued reference to FIG. 2, speed of rotation of the wheels or pulleys 36, 38 may optionally be modified by one or more gear sets 46. Moreover, the generator 32 may include a drive shaft 48 attached to the wheel or pulley 36. As the wheels or pulleys 36, 38 turn or rotate about the respective axles 42, 44 of the heat engine 24 in response to the dimensionally expanding and contracting first element 26 formed from the first shape memory alloy, the drive shaft 48 may rotate and drive the generator 32. That is, as described with reference to FIG. 2, the first shape memory alloy may alternately dimensionally expand at another localized region 50 in response to the second temperature, $T_2$, and dimensionally contract at the localized region 28 in response to the first temperature, $T_1$, to thereby convert thermal energy to mechanical energy and drive the generator 32. The generator 32 may then generate electricity 34 so that mechanical energy is converted to electricity 34.

In another non-limiting example, although not shown, the cooling system 10 may include the first element 26 in a straight-wire configuration. For example, in one variation, the heat engine 24 of the cooling system 10 may be configured as a linear actuator for the generator 32. The linear actuator may be used to directly convert reciprocating motion of a conductor moving in a magnetic field. In this variation, the first element 26 may be configured as two straight wires connected to a permanent magnet (not shown). When the shape memory alloy is warmed, e.g., exposed to the first temperature, $T_1$, of the heat source 12, the first element 26 dimensionally contracts. The contraction moves the permanent magnet and induces a voltage in windings (not shown) of the generator 32. Upon subsequent exposure to the coolant 14, the first shape memory alloy cools, and the first element 26 dimensionally expands. The first element 26 then continues to dimensionally expand and contract as long as a temperature difference, $\Delta T$, exists between the heat source 12 and the coolant 14.

Additionally, the heat engine 24 may be configured to act as a flywheel so that during selected operating conditions, conversion of thermal energy to mechanical energy can be bypassed. During such operating conditions, any kinetic energy of the heat engine 24 may still be harvested without necessary thermal energy input. Therefore, in this variation, the first element 26 may be protected from damage when heat engine speed and heat transfer rates are not synchronized.

Further, the heat engine 24 may also include cleaning components, e.g., brushes, configured for cleaning and/or scraping the first element 26 of the heat engine 24. For example, since the cooling system 10 may be operated in harsh and/or dirty environments, the cleaning components may remove corrosion and built-up dirt so that the heat engine 24 operates efficiently. In addition, although not shown, the heat engine 24 may also include other operational components such as permanent magnets, flaps, and springs, depending upon the desired application.

Referring again to FIG. 2, the heat engine 24 may also include a clutch (represented generally by arrows 52) configured for preventing operation of the heat engine 24 in a non-desired operational direction, e.g., counterclockwise or leftward. That is, the clutch 52 may include a ratcheting mechanism to allow the heat engine 24 to operate in only the desired operational direction. The clutch 52, therefore, may be characterized as "one-way" and may ensure that the heat engine 24 is not "back driven".

Referring now to FIG. 3, in one variation, the cooling system 10 may include a plurality of heat engines 24, 124. For example, the cooling system 10 may include two or more heat engines 24, 124. Further, the plurality of heat engines 24, 124 may be arranged in series and/or parallel along a length of the conduit 18. For example, the plurality of heat engines 24, 124 may be arranged in cascading sequence along the length of the conduit 18 so that relatively cooler coolant 14, from a first heat engine 24 acts as the heat source 12 for a second heat engine 124, to harvest maximum thermal energy from the heat source 12.

In one configuration described with reference to FIG. 3, multiple heat engines 24, 124 may be arranged along the length of the conduit 18 to be individually tuned via design and shape memory alloy selection to optimally operate according to slight temperature variations along the length of the conduit 18. That is, the plurality of heat engines 24, 124 may be arranged in a two-stage axial cascade configuration to exploit temperature differences along an axis 54 of the conduit 18. For example, one heat engine 24, i.e., a first stage, may be disposed upsteram of a second heat engine 124, i.e., a second stage. More specifically, two heat engines 24, 124 may be arranged at a first position having the first temperature, $T_1$, and a second position having the second temperature, $T_2$, that is lower than the first temperature, $T_1$. That is, the heat source 12 may cool slightly from the first position to the second position. At each position, a gap between the conduit 18 and the respective heat engines 24, 124 may vary to accommodate the relative temperature differences. For example, a gap at the second position may be smaller than the gap at the first position. Alternatively or additionally, the two heat engines 24, 124 may have two respective elements 26, 30 formed from two respective shape memory alloys having a respective first and second transformation temperature, $T_{trans1}$, $T_{trans2}$. Therefore, the plurality of heat engines 24, 124 may be selected to change crystallographic phase at different transformation temperatures, $T_{trans}$, according to a position and temperature of the heat source 12 and/or coolant 14 along the axis 54 of the conduit 18.

In another configuration, although not shown, the plurality of heat engines 24, 124 may be arranged in a two-stage radial cascade configuration to exploit radial temperature differences, i.e., temperature differences due to radial spacing from the conduit 18. For example, one heat engine 24, i.e., the first stage, may be disposed radially closer to the conduit 18 than a second heat engine 124, i.e., the second stage.

In both of the aforementioned non-limiting example configurations, the first stage and the second stage may be disposed in thermal relationship with one another, may cooperate, and/or may act independently. For example, the plurality of heat engines 24, 124 may share one element 26.

Referring again to FIG. 2, the cooling system 10 may also include a member 56 disposed in contact with the conduit 18 and configured for conducting thermal energy from the conduit 18 to the heat engine 24. For example, the member 56 may transfer thermal energy to the heat engine 24 via conduction. That is, to optimize mechanical energy and/or electricity output of the heat engine 24, the amount of waste heat transferred to the heat engine 24 from the heat source 12 must be maximized. Such optimization may be accomplished by minimizing heat lost through waste heat dissipation to the environment, directing heat from the heat source 12 to the heat engine 24, and/or optimizing a heat transfer rate from the heat source 12 to the first element 26. The member 56, therefore, may enable such optimization.

More specifically, the member 56 may be formed from any conductive material suitable for transferring thermal energy from the heat source 12 to the first element 26 of the heat engine 24. That is, the member 56 may be configured to transfer thermal energy from the conduit 18 to the heat engine 24 via conduction. For example, the member 56 may be formed from a metal having excellent thermal conductivity. As shown in FIG. 1, the member 56 is disposed in contact with the conduit 18 to transfer heat in the direction of arrows 58 between the conduit 18 and the first element 26.

Further, as shown in FIG. 2, the member 56 may include a plurality of contacting objects 60 configured for contacting the first element 26 to thereby change the crystallographic phase between austenite and martensite. For example, the plurality of contacting objects 60 may be flexible bristles, may extend from the member 56, and may contact the conduit 18 to effect conduction between the heat source 12, the first element 26, and/or the member 56 of the cooling system 10. In another example, the plurality of contacting objects 60 may be rollers configured to interface with the first element 26. The member 56 may be disposed in heat transfer relationship with the conduit 18, and the plurality of contacting objects 60 may be disposed in heat transfer relationship with the first element 26. Although not shown, the plurality of contacting objects 60 may also extend from the first element 26. For example, the first element 26 may include a plurality of flexible bristles.

Referring to FIG. 2, it is to be appreciated that the heat engine 24 may be disposed in any configuration or arrangement within the cooling system 10. That is, although not shown in FIG. 2, the member 56 and/or the contacting objects 60 may be disposed in thermal relationship with a portion of the first element 26 wound across a wheel or pulley 36. Alternatively, as shown in FIG. 2, the member 56 and/or the contacting objects 60 may be disposed in thermal relationship with a portion of the first element 26 spanning a distance between two wheels or pulleys 36, 38.

Referring again to FIG. 2, the cooling system 10 may further include an insulator 62 disposed in contact with the conduit 18 and configured for thermally insulating the conduit 18 and the member 56. In one variation, as shown in FIG. 2, the insulator 62 may be disposed in contact with the member 56. That is, insulator 62 may at least partially surround the conduit 18 and/or the member 56 to minimize heat transfer to the atmosphere external to the conduit 18. The insulator 62 may be formed from any suitable insulating material that is capable of absorbing and/or storing waste heat from the conduit 18, such as, but not limited to, a ceramic.

With continued reference to FIG. 2, the cooling system 10 may further include an apparatus 64 configured for adjusting the temperature difference, $\Delta T$, between the heat source 12 and the coolant 14. For example, the apparatus 64 may include air inlets, vanes, squirrel cage fans, centrifugal air pumps, and the like, for directing fluid flow across the first element 26 to thereby change a temperature of the first element 26. That is, the apparatus 64 may lower or increase a temperature of the first element 26. For example, the apparatus 64 may be oriented so that air external to the cooling system 10 and/or relatively cooler heat source 12 may flow across the first element 26 formed from the first shape memory alloy. As the apparatus 64 changes the temperature of the first element 26, the first element 26 may dimensionally expand or contract and induce motion of the heat engine 24 in the desired operational direction. Therefore, heat flow 58 may be increased or decreased to one region, e.g., the localized region represented by arrow 28, as compared to another region, e.g., another localized region represented by arrow 50, by the vent flaps or vanes.

Referring now to FIG. 4, in one variation, the cooling system 10 includes the aforementioned source of thermal energy, the cooling circuit 16, and the heat engine 24, and further includes a radiator 66 in fluid communication with the heat source 12 and the heat engine 24. The radiator 66 is configured for dissipating thermal energy from the coolant 14.

The radiator 66 may exchange heat from the heat source 12 with ambient cooling air flowing into the vehicle (not shown) in a direction of vehicle travel and/or with relatively warm coolant 14 discharged from the heat source 12. Further, the radiator 66 may provide relatively cool coolant 14 in the direction of arrows 68 in FIG. 4 to each of the coolant 14 and the heat source 12, and receive relatively warm coolant 14 in the direction of arrows 70 in FIG. 4 from the heat source 12.

In operation, and described with general reference to FIGS. 1 and 2, the heat engine 24, and in particular, the first element 26 formed from the first shape memory alloy, may be disposed in thermal relationship with each of the heat source 12 and the coolant 14, as set forth above. That is, the first element 26 may be disposed relative to each of the heat source 12 and the coolant 14 to react to the first temperature, $T_1$, and/or the second temperature, $T_2$. For example, the first element 26 of the heat engine 24 may be disposed in contact with the plurality of contacting objects 60 (FIG. 2) of the member 56 (FIG. 2) to effect crystallographic phase change of the first shape memory alloy via conduction.

Therefore, the first shape memory alloy may change crystallographic phase between austenite and martensite when in thermal relationship with one of the heat source 12 and the coolant 14. For example, when in thermal relationship with the heat source 12, the first shape memory alloy may change from martensite to austenite. Likewise, when in thermal relationship with the coolant 14, the first shape memory alloy may change from austenite to martensite.

Further, the first shape memory alloy may change dimension upon changing crystallographic phase to thereby convert thermal energy to mechanical energy. More specifically, the first shape memory alloy may dimensionally contract upon changing crystallographic phase from martensite to austenite, e.g., if pseudoplastically pre-strained, and may dimensionally expand upon changing crystallographic phase from austenite to martensite to thereby convert thermal energy to mechanical energy. Therefore, for any condition wherein the temperature difference exists between the first temperature, $T_1$, of the heat source 12 and the second temperature, $T_2$, of the coolant 14, i.e., wherein the heat source 12 and the coolant 14 are not in thermal equilibrium, the first shape memory alloy may dimensionally expand and contract upon changing crystallographic phase between martensite and austenite. Further, the change in crystallographic phase of the first shape memory alloy may be sufficient to drive the generator 32.

With reference to the cooling system 10 of FIGS. 1 and 2, during start-up and continuous operation of the heat engine 24, the localized region 28 (FIG. 2) is in thermal relationship with, e.g., in contact with, the heat source 12 while another localized region 50 (FIG. 2) is in thermal relationship with the coolant 14 to effect crystallographic phase change of the first shape memory alloy. As the other localized region 50 (FIG. 2) of the first shape memory alloy dimensionally expands, e.g., dimensionally stretches when under stress, when in thermal relationship with the coolant 14, the localized region (generally indicated by arrow 28 in FIG. 2) of the first shape memory alloy in thermal relationship with the heat source 12 dimensionally contracts when previously pseudoplastically pre-strained. Alternating dimensional contraction and expansion of the continuous spring loop form of the first element 26 upon exposure to the temperature difference, $\Delta T$, between the heat source 12 and the coolant 14 may convert potential mechanical energy to kinetic mechanical energy, and thereby convert thermal energy to mechanical energy. Therefore, for optimal efficiency of the cooling system 10, the heat source 12 and the coolant 14 are preferably rapidly refreshed to maintain the temperature difference, $\Delta T$, between the heat source 12 and coolant 14.

Referring again to FIG. 1, the heat engine 24 may be disposed in any location in the cooling system 10 as long as portions of the first element 26 are disposed in thermal relationship with a respective heat source 12 and coolant 14 during operation so that the first shape memory alloy may change crystallographic phase in response to at least one of the heat source 12, the coolant 14, and the temperature difference, $\Delta T$, between the heat source 12 and the coolant 14. Also, although not shown, it is to be appreciated that the cooling system 10 may include additional sensing and control components, e.g., an electronic control unit. The electronic control unit may be in operable communication with the cooling system 10 and be configured for regulating conversion of thermal energy to mechanical energy and/or electricity 34. The electronic control unit may be, for example, a computer that electronically communicates with one or more controls and/or sensors of the cooling system 10. For example, the electronic control unit may communicate with and/or control one or more of a temperature sensor of the heat source 12, a temperature sensor of the coolant 14, a speed regulator of the generator 32, fluid flow sensors, actuators, and meters configured for monitoring electricity generation.

Further, as shown in FIGS. 1 and 2, the cooling system 10 may also include a transfer medium 72 configured for conveying electricity 34 from the cooling system 10, e.g., from the generator 32. The transfer medium 72 may be, for example, a power line or an electrically-conductive cable. The transfer medium 72 may convey electricity 34 from the generator 32 to a storage device, e.g., a battery (not shown), an accumulator, and/or a collector. For example, the cooling system 10 may generate, store, and/or convey electricity 34 according to fluctuations in demand.

It is also to be appreciated that for any of the aforementioned examples, variations, or configurations, the cooling system 10 may include a plurality of heat engines 24, 124 elements 26, 30, and/or generators 32. That is, one cooling system 10 may include more than one heat engine 24, 124, element 26, 30, and/or generator 32. For example, one heat engine 24 may drive more than one generator 32.

While the best modes for carrying out the disclosure have been described in detail, those familiar with the art to which the disclosure relates will recognize various alternative designs and embodiments for practicing the disclosure within the scope of the appended claims.

The invention claimed is:

1. A cooling system configured for converting thermal energy to mechanical energy, the cooling system comprising:
  a source of thermal energy provided by a temperature difference between a heat source having a first temperature and a coolant having a second temperature that is lower than said first temperature;
  a cooling circuit configured for conveying said coolant to and from said heat source and including;
    a conduit; and
    a pump in fluid communication with said conduit and configured for delivering said coolant to said heat source;
  a heat engine disposed in thermal relationship with said conduit and configured for converting thermal energy to mechanical energy, wherein said heat engine includes a first element formed from a first shape memory alloy having a crystallographic phase changeable between austenite and martensite at a first transformation temperature in response to said temperature difference between said heat source and said coolant; and
  a member formed from a conductive material and disposed in contact with said conduit so that said member abuts said conduit and transfers thermal energy from said conduit to said first element via conduction;
  wherein said member includes a plurality of flexible bristles extending away from said conduit and disposed in contact with said first element.

2. The cooling system of claim 1, wherein said first shape memory alloy changes crystallographic phase from martensite to austenite to thereby dimensionally contract at a localized region in response to said heat source.

3. The cooling system of claim 2, wherein said first shape memory alloy changes crystallographic phase from austenite to martensite to thereby dimensionally expand at said localized region in response to said coolant.

4. The cooling system of claim 3, wherein said first shape memory alloy alternately dimensionally expands at said localized region in response to said second temperature and dimensionally contracts at said localized region in response to said first temperature to thereby convert thermal energy to mechanical energy.

5. The cooling system of claim 1, further including an insulator disposed in contact with said conduit and configured for thermally insulating said conduit.

6. The cooling system of claim 1, further including a plurality of heat engines.

7. The cooling system of claim 6, wherein said plurality of heat engines is arranged in series along said conduit.

8. The cooling system of claim 1, wherein said first element further has at least a second transformation temperature along a thickness of said first element at which said crystallographic phase changes between austenite and martensite.

9. The cooling system of claim 1, further including at least a second element formed from a second shape memory alloy having a crystallographic phase changeable between austenite and martensite at a second transformation temperature in response to said temperature difference between said heat source and said coolant.

10. The cooling system of claim 1, further including a generator configured for converting mechanical energy to electricity, wherein said generator is driven by said heat engine.

11. The cooling system of claim 10, wherein said first shape memory alloy alternately dimensionally expands at a localized region in response to said second temperature and dimensionally contracts at another localized region in response to said first temperature to thereby convert thermal energy to mechanical energy and drive said generator.

12. A cooling system configured for converting thermal energy to mechanical energy, the cooling system comprising:
a source of thermal energy provided by a temperature difference between a heat source having a first temperature and a coolant having a second temperature that is lower than said first temperature;
a cooling circuit configured for conveying said coolant to and from said heat source and including;
a conduit configured for recirculating said coolant in a closed loop within said cooling circuit; and
a pump in fluid communication with said conduit and configured for delivering the coolant to said heat source;
a heat engine disposed in thermal relationship with said conduit and configured for converting thermal energy to mechanical energy, wherein said heat engine includes a first element formed from a first shape memory alloy having a crystallographic phase changeable between austenite and martensite at a first transformation temperature in response to said temperature difference between said heat source and said coolant;
a member formed from a conductive material and disposed in contact with said conduit so that said member abuts said conduit and transfers thermal energy from said conduit to said first element via conduction, wherein said member includes a plurality of flexible bristles extending away from said conduit and disposed in contact with said first element to thereby change said crystallographic phase between austenite and martensite;
an insulator disposed in contact with said conduit and said member and configured for thermally insulating said conduit and said member; and
a generator configured for converting mechanical energy to electricity, wherein said first shape memory alloy alternately dimensionally expands at a localized region in response to said second temperature and dimensionally contracts at another localized region in response to said first temperature to thereby convert thermal energy to mechanical energy and drive said generator.

13. A cooling system configured for converting thermal energy to mechanical energy, the cooling system comprising:
a source of thermal energy provided by a temperature difference between a heat source having a first temperature and a coolant having a second temperature that is lower than said first temperature;
a cooling circuit configured for conveying said coolant to and from said heat source and including;
a conduit; and
a pump in fluid communication with said conduit and configured for delivering said coolant to said heat source;
a heat engine disposed in thermal relationship with said conduit and configured for converting thermal energy to mechanical energy, wherein said heat engine includes a first element formed from a first shape memory alloy having a crystallographic phase changeable between austenite and martensite at a first transformation temperature in response to said temperature difference between said heat source and said coolant;
a member formed from a conductive material and disposed in contact with said conduit so that said member abuts said conduit and transfers thermal energy from said conduit to said first element via conduction;
wherein said member includes a plurality of flexible bristles extending away from said conduit and disposed in contact with said first element; and
a radiator in fluid communication with said heat source and said heat engine and configured for dissipating thermal energy from said coolant.

14. The cooling system of claim 13, wherein said first shape memory alloy alternately dimensionally expands at a localized region in response to said second temperature and dimensionally contracts at said localized region in response to said first temperature to thereby convert thermal energy to mechanical energy.

15. The cooling system of claim 14, further including a generator configured for converting mechanical energy to electricity, wherein said generator is driven by said heat engine.

16. The cooling system of claim 13, wherein said coolant recirculates within said cooling circuit in a closed loop.

* * * * *